US012307008B2

(12) United States Patent
Nakamura et al.

(10) Patent No.: US 12,307,008 B2
(45) Date of Patent: May 20, 2025

(54) DISPLAY CONTROL DEVICE

(71) Applicant: NTT DOCOMO, INC., Tokyo (JP)

(72) Inventors: Yuki Nakamura, Chiyoda-ku (JP);
Yasuo Morinaga, Chiyoda-ku (JP);
Mitsuhiro Goto, Chiyoda-ku (JP);
Tatsuya Nishizaki, Chiyoda-ku (JP);
Reo Mizuta, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/291,756

(22) PCT Filed: Jun. 6, 2022

(86) PCT No.: PCT/JP2022/022834
§ 371 (c)(1),
(2) Date: Jan. 24, 2024

(87) PCT Pub. No.: WO2023/026628
PCT Pub. Date: Mar. 2, 2023

(65) Prior Publication Data
US 2024/0345657 A1   Oct. 17, 2024

(30) Foreign Application Priority Data
Aug. 25, 2021 (JP) .................. 2021-137104

(51) Int. Cl.
*G09G 5/00* (2006.01)
*G06F 3/01* (2006.01)
(52) U.S. Cl.
CPC ................. *G06F 3/013* (2013.01)

(58) Field of Classification Search
CPC ........ G06F 3/013; G06F 3/1454; G06F 3/012; G06F 2203/011
(Continued)

(56) References Cited

U.S. PATENT DOCUMENTS

| 10,146,333 B1 * | 12/2018 | Smith ..................... G06F 3/017 |
| 2014/0354683 A1 * | 12/2014 | Suzuki .................. G06T 19/006 345/632 |
| 2020/0288083 A1 * | 9/2020 | Toda .................... H04N 13/167 |

FOREIGN PATENT DOCUMENTS

| JP | 2018-73172 A | 5/2018 |
| JP | 2020-39052 A | 3/2020 |

OTHER PUBLICATIONS

International Search Report mailed on Aug. 9, 2022 in PCT/JP2022/022834 filed on Jun. 6, 2022 (2 pages).
(Continued)

*Primary Examiner* — Jennifer T Nguyen
(74) *Attorney, Agent, or Firm* — Oblon, McClelland, Maier & Neustadt, L.L.P.

(57) ABSTRACT

A display control device is a device that performs control relating to display in a display displaying display information arranged in common in a common virtual space with another display in accordance with a visual line for each display in the virtual space based on a position or a posture in a real space for each display, the display control device includes: a position of interest information acquiring unit configured to acquire position of interest information representing a position of interest in a virtual space in the other display according to display in the other display; and a visual line moving unit configured to move the visual line in the virtual space in the display of the display on the basis of the acquired position of interest information.

13 Claims, 7 Drawing Sheets

(58) Field of Classification Search
USPC .......................................................... 345/156
See application file for complete search history.

(56) References Cited

OTHER PUBLICATIONS

Japanese Office Action issued Oct. 1, 2024 in Japanese Patent Application No. 2023-543701 (with English translation), 6 pages.
International Preliminary Report on Patentability and Written Opinion Issued Mar. 7, 2024 in PCT/JP2022/022834, (with English translation), 6 pages.

* cited by examiner

Fig.4
(a)
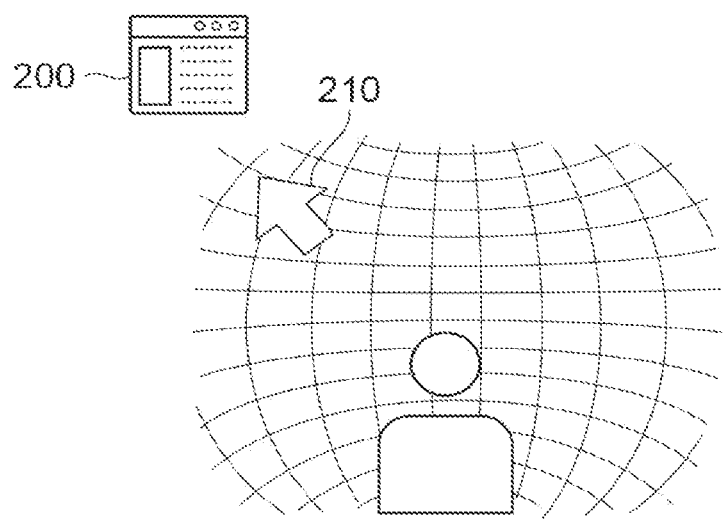
(b)
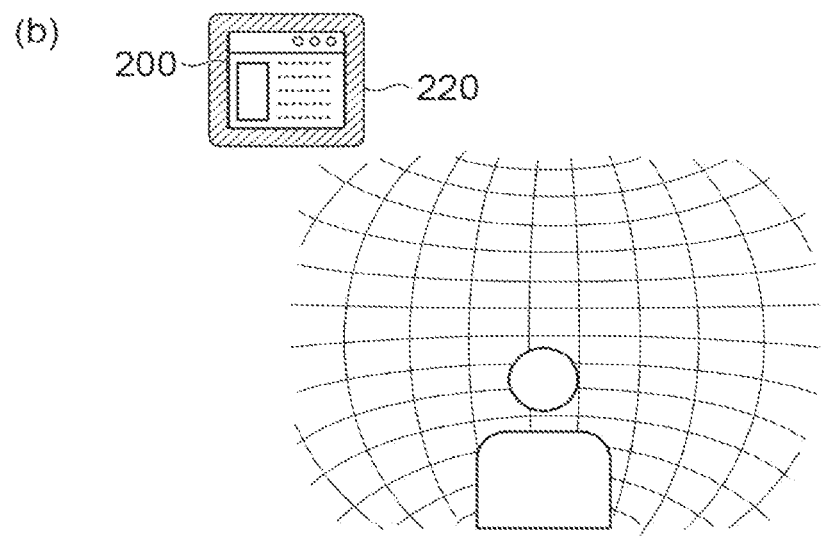
(c)
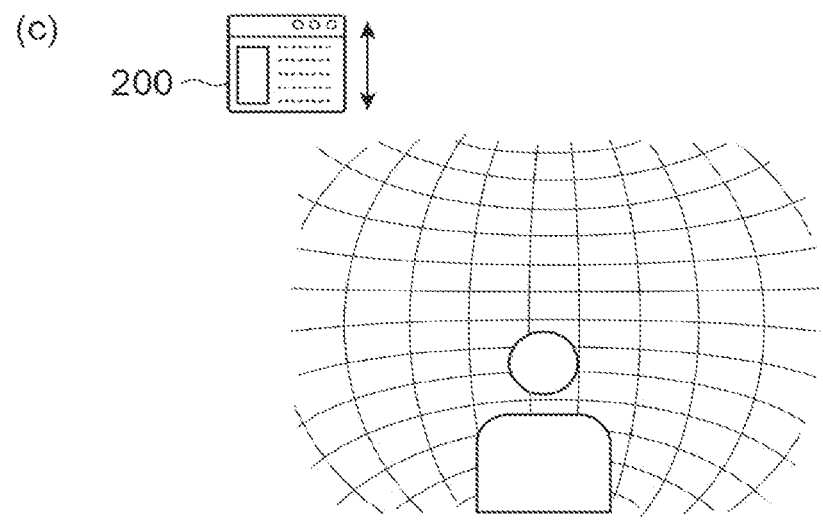

| CONTENT ID | CONTROLLER PATTERN |
| --- | --- |
| ID-Q5WE6RT | CONSECUTIVE TAP OF CENTER PART n TIMES |
| ID-JSN3G49 | CONSECUTIVE TRIGGER OF n TIMES |
| ID-XYZ1245 | CONSECUTIVE PRESSING OF BUTTON n TIMES |
| ID-U8UH5GI | DRAWING OF O |

(b)

| CONTENT ID | HAND GESTURE |
| --- | --- |
| ID-Q5WE6RT | Fist |
| ID-JSN3G49 | OK |
| ID-XYZ1245 | C |
| ID-U8UH5GI | PEACE SIGN |

DISPLAY CONTROL DEVICE

TECHNICAL FIELD

The present invention relates to a display control device performing control relating to display in a display.

BACKGROUND ART

Conventionally, it has been proposed to display an entire celestial sphere image in a head-mounted display (for example, see Patent Literature 1). For example, a part of an entire celestial sphere image is displayed in accordance with orientation of a head-mounted display, and by changing orientation of the head-mounted display, that is, orientation of a user's head, another part of the entire celestial sphere image is displayed.

CITATION LIST

Patent Literature

[Patent Literature 1] Japanese Unexamined Patent Publication No. 2020-39052

SUMMARY OF INVENTION

Technical Problem

Conventionally, a technology for sharing display in a display with another user's display is used. Sharing of display with another user can be performed also for display of a form using the entire celestial sphere image described above. For example, in a plurality of head-mounted displays, it may be considered to display information arranged in a virtual space in accordance with a visual line in the virtual space, configure the virtual space to be common among the head-mounted displays, and display common information. At this time, by configuring visual lines in the virtual space to be independent from each other for each head-mounted display, a user of each head-mounted display can refer to mutually different displays according to a visual line in the virtual space.

In sharing of display among displays as described above, there are cases in which content viewed by another user in a virtual space is desired to be known. For example, in a case in which users of displays having shared display are in a conversation with each other, there are cases in which the users desire to refer to the same content. For this reason, for example, a position of content of interest among users may be considered to be exchanged using a conversation such as a voice call or the like. However, in this method, it takes time to discover content of interest. Particularly, in the case of display in a display having a narrow viewing angle such as a glasses-type display or the like, in a case in which the number of pieces of content arranged in a virtual space is large, in a case in which directions of visual lines between displays are greatly different from each other (for example, in a case in which azimuth angles of visual lines in the virtual space between displays deviate from each other by 180 degrees), and the like, the problem described above becomes remarkable. In addition, a position of a display needs to be indicated whenever content of interest (in other words, display of a target desired to be referred to by users) changes, and thus it is difficult to make a smooth conversation.

An embodiment of the present invention is in view of the description presented above, and an object thereof is to provide a display control device capable of appropriately performing display in a case in which information of a common virtual space between a plurality of displays is displayed.

Solution to Problem

In order to achieve the object described above, according to one embodiment of the present invention, there is provided a display control device that performs control relating to display in a display displaying display information arranged in common in a common virtual space with another display device in accordance with a visual line for each display in the virtual space based on a position or a posture in a real space for each display, the display control device including: a position of interest information acquiring unit configured to acquire position of interest information representing a position of interest in a virtual space in the other display according to display in the other display; and a visual line moving unit configured to move the visual line in the virtual space in the display of the display on the basis of the position of interest information acquired by the position of interest information acquiring unit.

In addition, according to one embodiment of the present invention, there is provided a display control device that performs control relating to display in a display displaying display information arranged in common in a common virtual space with another display device in accordance with a visual line for each display in the virtual space based on a position or a posture in a real space for each display, the display control device including: a position of interest information generating unit configured to generate position of interest information representing a position of interest in a virtual space in the display in accordance with display in the display by a predetermined trigger, and a transmission unit configured to transmit the position of interest information generated by the position of interest information generating unit to another display.

According to control according to such a display control device, a visual line in a virtual space in display of one display is moved on the basis of a position of interest in a virtual space in another display according to display in the other display. Thus, for any one display, display according to the position of interest in the virtual space is performed, and, for example, the same display information can be referred to between users of the displays. In other words, according to a display control device according to one embodiment of the present invention, in a case in which information of a virtual space that is common among a plurality of displays is displayed, display can be appropriately performed.

Advantageous Effects of Invention

According to a display control device of one embodiment of the present invention, in a case which information of a common virtual space between a plurality of displays is displayed, display can be appropriately performed.

BRIEF DESCRIPTION OF DRAWINGS

FIG. 4 is a diagram illustrating an example of display after movement of a visual line of a virtual space.

FIG. 5 is a diagram illustrating an example of information used for designation of display information.

DESCRIPTION OF EMBODIMENTS

Hereinafter, a display control device according to an embodiment of the present invention will be described in detail with reference to the drawings. The same reference signs will be assigned to the same elements in description of the drawings and duplicate description will be omitted.

Figure 1:
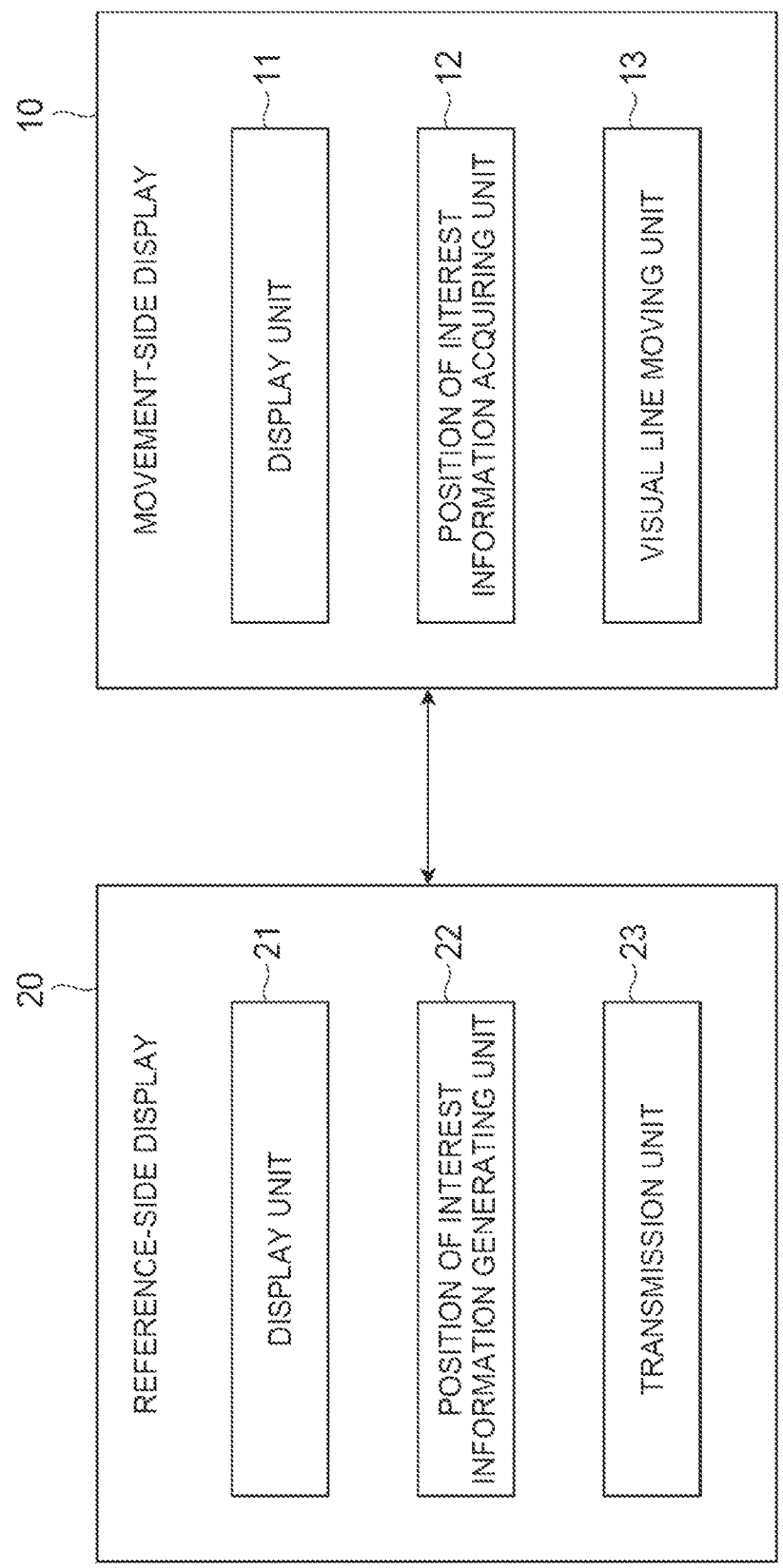
FIG. 1 is a diagram illustrating a functional configuration of a movement-side display and a reference-side display that are display control devices according to an embodiment of the present invention.

FIG. 1 illustrates displays 10 and 20 as display control devices according to this embodiment. In accordance with functions according to this embodiment to be described below, in the following description, the display 10 will also be referred to as a movement-side display 10, and the display 20 will also be referred to as a reference-side display 20. The displays 10 and 20 that are display devices perform control relating to display in the displays 10 and 20. The displays 10 and 20 display display information that is commonly arranged in a common virtual space with the other display 10 or 20 (the display 10 or 20 other than the display itself) in accordance with a visual line for each of the displays 10 and 20 of the virtual space. The visual line for each of the displays 10 and 20 of the virtual space is on the basis of positions or postures of the displays 10 and 20 in a real space.

For example, each of the displays 10 and 20 displays display information (an asset) arranged in a virtual three-dimensional space in accordance with a visual line in the virtual space. The display information is information that is displayed in the displays 10 and 20. For example, the display information is content such as text, an image, a moving image, or the like. Alternatively, the display information may be one in which displayed content can be changed, such as a scheduler, a browser, a social networking service (SNS), and a specific application. A specific detail of the display information described above, for example, may be a recipe, a memo, a map, a news article, a source code, a design drawing, various materials, and the like. In addition, the display information may be one in which communication such as chatting or the like between users of the displays 10 and 20 can be performed. In addition, the display information may be a three-dimensional computer graphics (3DCG) model. Furthermore, display of display information may be performed using a cloud service. In addition, the display information may be information other than that described above and may be any information as long as it is arranged in a virtual space and can be displayed in accordance with a visual line of a virtual space.

For example, each of the displays 10 and 20 is a display that performs display of virtual content (display information) using augmented reality (AR) or the like. Each of the displays 10 and 20 is a transmissive display mounted on an eye part of a user. For example, each of the displays 10 and 20 may be a head-mounted display of a glasses type, that is, see-through glasses (smart glasses or AR glasses). The displays 10 and 20 are used by mutually different users. In addition, the displays 10 and 20 need not be mounted on users.

Each of the displays 10 and 20 displays display information of an area viewed from a reference position of a visual line in a virtual space in a direction of the visual line in the virtual space in a visible state. The visual line in the virtual space is configured to include a reference position of the visual line in the virtual space and a direction of the visual line in the virtual space. Each of the displays 10 and 20 can perform display by moving the visual line in the virtual space. By moving the visual line in the virtual space, display information viewed in the virtual space changes, and display using the displays 10 and 20 also changes.

The movement of the visual line in the virtual space is performed using a method set in advance. For example, the movement of the visual line in the virtual space is performed with degrees of freedom set in advance. The degrees of freedom set in advance, for example, are 3 degrees of freedom (DoF). In 3DOF, a reference position of the visual line in the virtual space is fixed, and only the direction of the visual line in the virtual space can rotate around three axes including an X axis, a Y axis, and a Z axis of the virtual space. However, the movement of the visual line in the virtual space may be performed using degrees of freedom other than those described above and a method other than that described above.

Figure 2:
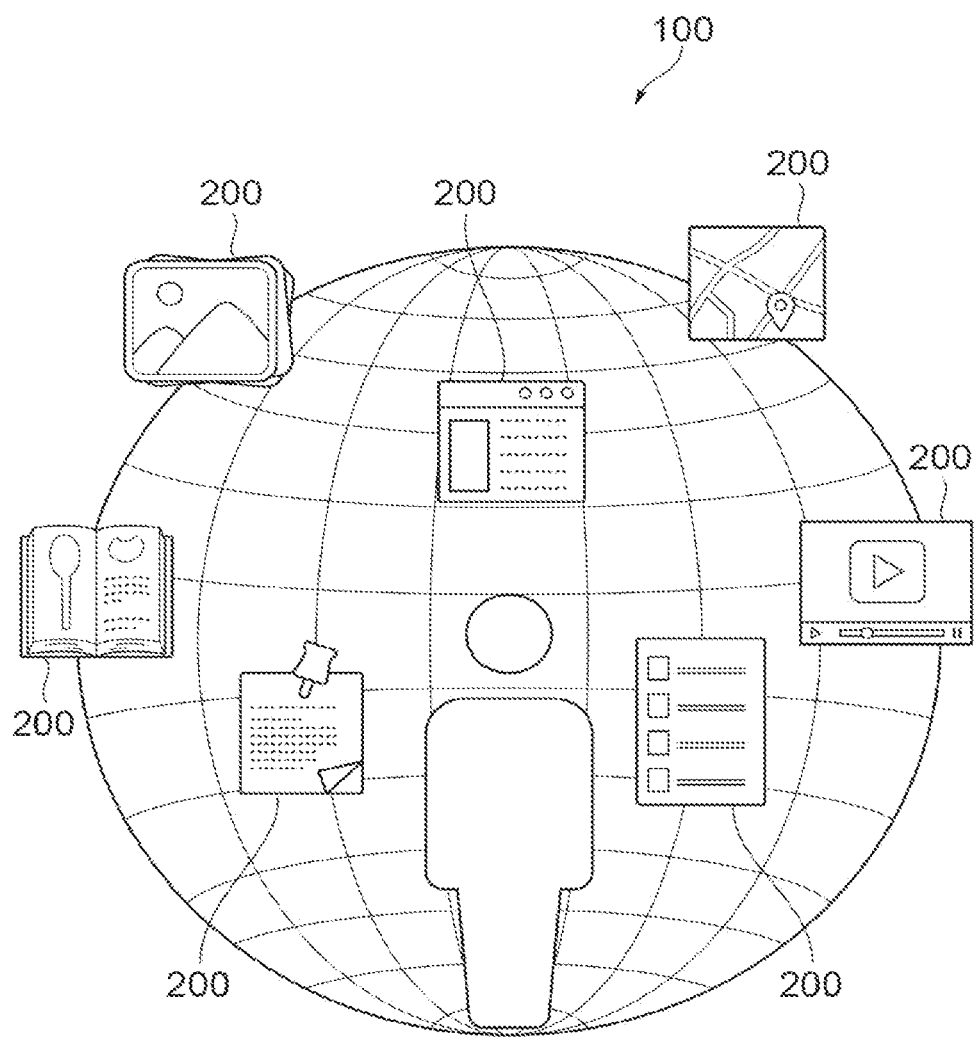
FIG. 2 is a diagram illustrating examples of a virtual space relating to display in a display and display information arranged in a virtual space.

For example, as illustrated in FIG. 2, a sphere (an entire celestial sphere) 100 is provided in a virtual space, and display information 200 is arranged along the sphere 100 or inside or outside the sphere 100. For example, planar display information 200 is arranged toward the center of the sphere 100 along a tangential plane of the sphere 100. In other words, the display information 200 is arranged such that it is viewed from the center of the sphere 100. In this case, the center of the sphere 100 is set as a reference position of the visual line in the virtual space.

Each of the displays 10 and 20 displays the display information 200 viewed from the reference position of the visual line in the virtual space in a direction of the visual line in the virtual space in a visible state. A shape of a displayed area is a shape of a display screen in each of the displays 10 and 20, for example, a rectangular shape. As described above, a viewing angle (an angle at which a virtual space can be displayed) of each of the displays 10 and 20 is limited, and only a part corresponding to a part of the sphere 100 is displayed. By changing the direction of the visual line in the virtual space, a position of a displayed area changes, and display using each of the displays 10 and 20 changes. In this way, the displays 10 and 20 may be entire celestial sphere displays. The display described above in each of the displays 10 and 20 may be performed using an application performing the corresponding display. A direction of the visual line at the time of starting an application may be a default direction set in advance or may be a different direction for each of the displays 10 and 20.

As described above, the visual line for each of the displays 10 and 20 of the virtual space is on the basis of a position or a posture of the displays 10 and 20 in a real space. For this reason, in each of the displays 10 and 20, a sensor that detects a movement (that is, a change of a position) and orientation (that is, a posture) of the display 10 or 20 may be disposed. For example, an acceleration sensor that detects an acceleration and a gyro sensor that detects an angular velocity may be disposed. Each of the displays 10 and 20 detects a movement and an orientation of the display 10 or 20 using such sensors and moves the visual line in the virtual space in accordance with the motion and the orientation that have been detected. In other words, the visual line may move in accordance with orientation of a head part (face) of a user on which each of the displays 10 and 20 is mounted. Here, the movement of the visual line in the virtual space may be performed in accordance with detection of a position or a posture using a sensor other than those described above. In addition, in a case in which the visual line is moved by 3DoF as described above, only a direction may be detected.

Display in each of the displays 10 and 20 using the visual line in the virtual space including movement of the visual line in the virtual space may be performed similar to display using conventional AR or the like. In addition, storing and processing of information about a virtual space may be performed in one of the displays 10 and 20 or may be performed in a cloud or the like connected to the displays 10 and 20.

In display in the displays 10 and 20, display information that is arranged in common in a common virtual space is used. In other words, a virtual space and display information may be shared between a plurality of displays 10 and 20. The plurality of displays 10 and 20 sharing the virtual space and the display information are set in advance. In display in the displays 10 and 20, independent visual lines in the virtual space for the respective displays 10 and 20 are used. When there is a difference between visual lines in the displays 10 and 20, for example, in the case of 3DoF, when there is a difference between directions of the visual lines, different display according to each visual line is performed in the displays 10 and 20. When the visual lines are the same in the displays 10 and 20, for example, as described above, in the case of 3DoF, and the directions of the visual lines are the same, the same display is performed in the displays 10 and 20. In addition, in this embodiment, although an example in which a virtual space is common to two displays 10 and 20 is illustrated, a virtual space may be common to three or more displays 10 and 20.

In the displays 10 and 20, an operation relating to display, for example, a user's operation for the display information 200, may be performed. The displays 10 and 20 accept a user's operation and reflect the operation in the display. For example, operations such as movement of the display information 200 in a virtual space, enlargement and reduction of the display information, text input for the display information, rotation of the sphere 100, and the like may be performed.

For example, the operation may be performed using an information processing device such as a smartphone or the like held by a user on whom the display 10 or 20 is mounted. In such a case, the display 10 or 20 and the smartphone are connected in advance such that information can be transmitted and received. When a user performs an operation on the smartphone, the operation is reflected in display in the display 10 or 20. In addition, display in which a laser pointer is output at a position where the smartphone held by a user is pointing from the smartphone may be performed. Furthermore, an operation such as designation of display information or the like may be performed in the display of such a laser pointer.

In addition, an operation may be performed using a dedicated controller attached to a head-mounted display. An operation may be performed using a user's gesture. For example, a user's part performing a gesture is a hand. In other words, an operation using a hand gesture may be performed. However, an operation using a gesture of a part other than a hand may be performed. In a case in which an operation using a user's gesture is performed, a camera is disposed such that a part performing the gesture can be captured, and the gesture is determined using a moving image captured by the camera. In addition, the operation may be performed using an arbitrary method other than that described above. The display and the operation described above in the displays 10 and 20 may be performed using a method similar to a conventional method.

As each of the displays 10 and 20, a display having the conventional functions described above can be used. In addition, the displays 10 and 20 have a communication function. The communication function of the displays 10 and 20 is used for sharing of the virtual space and the display information described above and realizing functions according to this embodiment. In addition, some of the functions described above and functions according to this embodiment that will be described below of the displays 10 and 20 may be included in an information processing device (for example, a smartphone or a personal computer (PC)) connected to a display device (for example, the see-through glasses described above). In other words, the displays 10 and 20 according to this embodiment may be realized by including a display device and an information processing device therein.

As described above, when each of the displays 10 and 20 is an entire celestial sphere display, each of the displays 10 and 20 displays an image, a moving image, a browser, and the like as display information as described above, whereby a work space dedicated for users on whom the displays 10 and 20 are mounted can be built. In accordance with this, at any time and at any place, a private space can be moved, and a world in which concentration or relaxation can be performed can be built. In addition, when each of the displays 10 and 20 is see-through glasses, display information can be used while another operation is performed in a real space, in other words, display information can be used during another operation.

In addition, in accordance sharing of the virtual space and the display information between a plurality of displays 10 and 20 as described above, in an image in which a plurality of persons enter this entire celestial sphere display, for example, the display information can be shared simultaneously with other users using different displays 10 and 20 at the same place or a remote place. Thus, visual and intuitive communication according to space sharing can be improved. By intuitively sharing a point of view or an idea with other users, widths of a perspective and thinking can be widened. In addition, a world, in which a conversation for which relating information is constantly displayed can be easily made, can be configured.

Use cases as individual tools of the displays 10 and 20 include a work, a hobby, shopping, work commuting, school commuting, and the like. In addition, as use cases of sharing a virtual space and display information in a plurality of displays 10 and 20, there are a conference, a workshop, chatting, planning, and the like.

Subsequently, functions of the movement-side display 10 and the reference-side display 20 according to this embodiment will be described. In addition, the movement-side display 10 may have the function of the reference-side display 20 according to this embodiment. In addition, the reference-side display 20 may have the function of the movement-side display 10 according to this embodiment.

The displays 10 and 20 may have the functions of both the movement-side display 10 and the reference-side display 20 according to this embodiment. In addition, the displays 10 and 20 may have the function included in a conventional display device such as conventional see-through glasses or the like in addition to those described below.

The functions of the movement-side display 10 and the reference-side display 20 according to this embodiment are for moving a visual line in the virtual space in the movement-side display 10 on the basis of a position of interest in the virtual space in the reference-side display 20 according to display in the reference-side display 20. By moving the visual line in the virtual space in the movement-side display 10, the display in the movement-side display 10 changes. In accordance with this, in the movement-side display 10, display information displayed in the reference-side display 20 is displayed, and each user can refer to the same display information. Here, as will be described below, even when the visual line in the virtual space moves in the movement-side display 10, there are also cases in which display information displayed in the reference-side display 20 is not displayed in the movement-side display 10.

Figure 3:
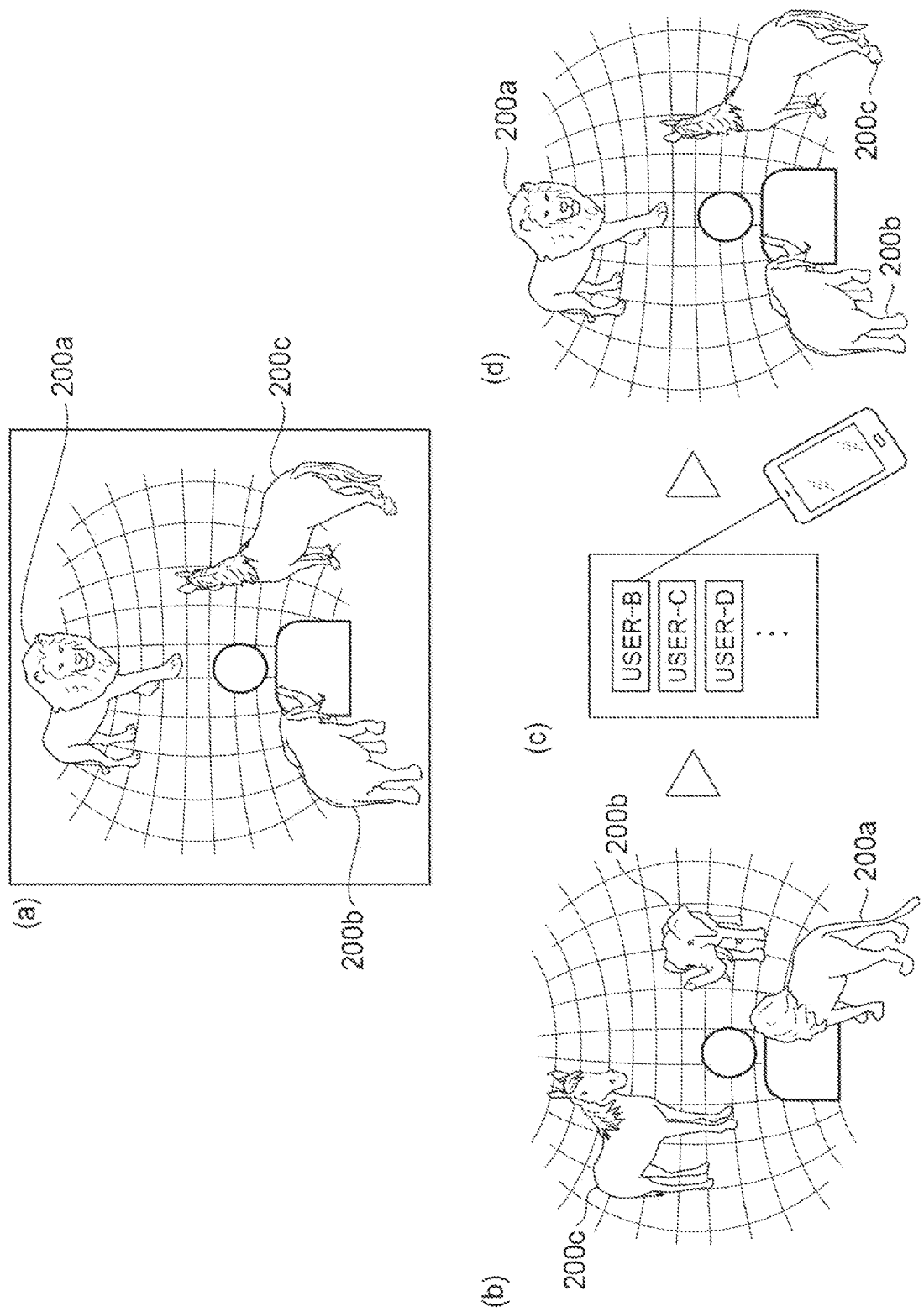
FIG. 3 is a diagram illustrating movement of a visual line of a virtual space.

As illustrated in FIG. 3(a), in a virtual space, a lion 200a, an elephant 200b, and a horse 200c that are display information 200 are arranged at respective positions. As illustrated in FIG. 3(a), the visual line in the virtual space in the reference-side display 20 is toward a side on which the lion 200a is arranged, and the lion 200a is displayed in the reference-side display 20. The elephant 200b and the horse 200c are arranged on a side opposite to a direction of the visual line in the virtual space in the reference-side display 20, and the elephant 200b and the horse 200c are not displayed in the reference-side display 20.

On the other hand, as illustrated in FIG. 3(b), the visual line in the virtual space in the movement-side display 10 is toward a side on which the elephant 200b and the horse 200c are arranged, and the elephant 200b and the horse 200c are displayed in the movement-side display 10. In addition, the lion 200a is arranged on a side opposite to the direction of the visual line in the virtual space in the movement-side display 10, and the lion 200a is not displayed in the movement-side display 10. Thus, a user of the movement-side display 10 and the reference-side display 20 cannot refer to the same display information 200.

By using the functions of the movement-side display 10 and the reference-side display 20 according to this embodiment, as illustrated in FIG. 3(d), the visual line in the virtual space in the movement-side display 10 is moved to face a side on which the lion 200a is arranged on the basis of the position of interest in the virtual space in the reference-side display 20. In accordance with this movement of the visual line, the lion 200a is displayed also in the movement-side display 10. Thus, a user of the movement-side display 10 and the reference-side display 20 can refer to the same display information 200 (the lion 200a in the case of this example).

As illustrated in FIG. 1, the movement-side display 10 is configured to include a display unit 11, a position of interest information acquiring unit 12, and a visual line moving unit 13.

The display unit 11 is a functional unit that performs display in the movement-side display 10. The display unit 11 inputs display information to be displayed in the display 10 and displays the display information. For example, the display unit 11 may input display information stored in the display 10 or may receive display information from the outside to input the display information. As described above, the display unit 11 displays display information arranged in a virtual space in accordance with the visual line in the virtual space. In addition, as described above, the display unit 11 shares the virtual space and the display information with the reference-side display 20 that is another display. For example, the sharing of the virtual space and the display information is performed by transmitting/receiving display information and information representing a position in a virtual space at which the display information is arranged to/from the reference-side display 20. In addition, the sharing of a virtual space and display information may be performed not by performing direct exchange between the displays 10 and 20 but through a server with which each of the displays 10 and 20 can communicate. Furthermore, the sharing of a virtual space and display information between the displays 10 and 20 may be performed using a method other than the method described above. In addition, information other than the information described above that is transmitted/received between the displays 10 and 20 may also be directly transmitted/received between the displays 10 and 20 or transmitted/received through a server or the like.

The function of the display unit 11 described above may be similar to a conventional function. As will be described below, the display according to the display unit 11 is controlled by the visual line moving unit 13.

The position of interest information acquiring unit 12 is a functional unit that acquires position of interest information representing a position of interest in a virtual space in the reference-side display 20 according to display of the reference-side display 20 that is another display. The position of interest information is information that can be used for identifying a visual line of a virtual space that corresponds to the position of interest. In the case of the 3DoF as described above, a reference position of the visual line is a center of the sphere 100 and is identified, and thus the position of interest information is information that can be used for identifying a direction of the visual line in the virtual space. For example, the position of interest information represents coordinates of the sphere 100 in a coordinate system of a virtual space. Alternatively, the position of interest information may represent two deflection angles in a polar coordinate system of the virtual space. The two deflection angles of such a case are a polar angle (a zenith angle, an elevation angle) $\theta$ and an azimuth angle $\varphi$. A virtual space corresponds to a real space, and a polar angle $\theta$ and an azimuth angle $\varphi$ in the virtual space correspond to a polar angle and an azimuth angle in the real space. In other words, the polar angle $\theta$ in the virtual space is an angle corresponding to a vertical direction in the real space, and the azimuth angle $\varphi$ in the virtual space is an angle corresponding to a horizontal direction in the real space. In addition, the position of interest information may be information other than that described above as long as it represents a position of interest.

The position of interest information acquiring unit 12 receives and acquires position of interest information from the reference-side display 20. The reference-side display 20 transmits position of interest information to the movement-side display 10 in response to a request from the movement-side display 10 or in accordance with its own trigger of the reference-side display 20.

For example, in the movement-side display 10, in a case in which there is a user' operation indicating a request for position of interest information, the position of interest information acquiring unit 12 requests position of interest information from the reference-side display 20. More specifically, the position of interest information acquiring unit 12 accepts an operation (an operation using display of the laser pointer described above) from a user designating a user of the reference-side display 20 using a user interface (UI) as illustrated in FIG. 3(c) and requests the reference-side display 20 corresponding to the designated user for position of interest information. In this case, there are a plurality of reference-side displays 20, and position of interest information of the reference-side display 20 of the user designated by the user is acquired.

In this way, in a case in which the position of interest information is acquired, in the movement-side display 10, processing is performed in order of display before movement of the visual line illustrated in FIG. 3(b), acceptance of designation of a user of the reference-side display 20 illustrated in FIG. 3(c), and display after movement of the visual line illustrated in FIG. 3(d). A case in which the position of interest information is transmitted to the movement-side display 10 in accordance with its own trigger of the reference-side display 20 will be described below. The position of interest information acquiring unit 12 outputs the acquired position of interest information to the visual line moving unit 13.

The visual line moving unit 13 is a functional unit that moves the visual line in the virtual space in display of the movement-side display 10 on the basis of the position of interest information acquired by the position of interest information acquiring unit 12. The visual line moving unit 13 may move the visual line also on the basis of the visual line in the virtual space in the display of the movement-side display 10 before movement. The visual line moving unit 13 may move the visual line in a direction set in advance with reference to the visual line in the virtual space in the display of the movement-side display 10 before movement. In a case in which a position of interest represented by the position of interest information or display information relating to the position of interest is not included in the display of the movement-side display 10, the visual line moving unit 13 may cause the movement-side display 10 (that is, the display unit 11) to perform display representing the position of interest or the position of the display information. For display information relating to a position of interest represented by the position of interest information, the visual line moving unit 13 may cause the movement-side display 10 (that is, the display unit 11) to perform display representing that it relates to the position of interest.

For example, the visual line moving unit 13 moves the visual line in the virtual space in the display of the movement-side display 10 as below. The visual line moving unit 13 receives position of interest information from the position of interest information acquiring unit 12 as an input. The visual line moving unit 13 moves (synchronizes, transitions) the visual line in the virtual space relating to the display according to the display unit 11 to a position identified by the input position of interest information. In accordance with this movement, the display according to the display unit 11 corresponds to the visual line after movement.

In addition, the visual line moving unit 13 may move (rotate) the visual line in the virtual space such that the visual line in the virtual space after movement matches a visual line identified by the position of interest information only at an azimuth angle $\varphi$. In other words, the visual line moving unit 13 may move the visual line in the virtual space only in the horizontal direction. In such a case, the position of interest information may include only information representing the azimuth angle $\varphi$. In addition, in a case in which the position of interest information does not directly represent an azimuth angle $\varphi$, the visual line moving unit 13 may calculate an azimuth angle for movement at this time point.

For example, it is assumed that an azimuth angle $\varphi_B$ of interest that is an azimuth angle of a direction of a position of interest in the virtual space of the reference-side display 20 (USER-B) illustrated in FIG. 3(a) is $\varphi_B=\varphi$, and an azimuth angle $\varphi_A$ of the visual line in the virtual space before movement in the virtual space of the movement-side display 10 (USER-A) illustrated in FIG. 3(b) is $\varphi_A=\varphi+\pi$. In this case, the visual line moving unit 13 rotates the visual line in the virtual space of the movement-side display 10 in the horizontal direction (in other words, around the Z axis) by $\pi$ such that, as illustrated in FIG. 3(d), the azimuth angle $\varphi_A$ of the visual line in the virtual space after movement in the virtual space of the movement-side display 10 is $\varphi_A=\varphi$.

In this way, by moving (synchronizing) the visual line in the virtual space only at the azimuth angle, in other words, by restricting the movement (synchronization) of the visual line to a degree of freedom "1", the display in the virtual space can be changed with correspondence of the direction of a polar angle with a real space being maintained. In accordance with this, user's stress and sickness relating to space recognition of the user of the movement-side display 10 can be reduced. In other words, changes in the display according to movement of the visual line can be configured to be more easily accepted by a user of the movement-side display 10.

In this way, the visual line moving unit 13 may move the visual line also on the basis of the visual line in the virtual space in display of the movement-side display 10 before movement. In addition, the visual line moving unit 13 may move the visual line in a direction set in advance (in the example described above, the direction of the azimuth angle) with reference to the visual line in the virtual space in display of the movement-side display 10 before movement.

In a case in which the visual line in the virtual space is moved only in a direction set in advance such as an azimuth angle or the like as described above, when there is a big difference between a polar angle of the visual line in the virtual space of the reference-side display 20 and a polar angle of the visual line in the virtual space of the movement-side display 10 before movement, there is concern that a position of interest and display information 200 relating to the position of interest (a content of interest, a target content) may not be included in a display range in the movement-side display 10. For example, display information 200 relating to a position of interest is display information 200 that is present at the position of interest, display information 200 that is the closest to the position of interest, or display information 200 that is within a predetermined distance from the position of interest. In other words, when the visual line in the virtual space moves, there is concern that the display information 200 described above may be outside of the visual field.

In a case in which, after movement of the visual line in the virtual space, a position of interest represented by the position of interest information or display information 200 relating to the position of interest is not included in display of the movement-side display 10, the visual line moving unit 13 may cause the display unit 11 to perform display representing the position of interest or a position of the display information 200. The visual line moving unit 13 calculates a display range in the movement-side display 10 from the visual line in the virtual space after movement. The visual line moving unit 13 determines whether or not the position of interest or the display information 200 is included in the calculated display range and, in a case in which it is determined that the position of interest or the display information 200 is not included in the display range, causes the display unit 11 to perform the display described above. For example, as illustrated in FIG. 4(a), this display is an arrow 210 indicating a direction in which the position of interest or the display information 200 is present (that is, an arrow tag supplementing these). A user of the movement-side display 10 can easily find the position of interest or the display information 200 by referring to this display.

In addition, the visual line moving unit 13, for display information relating to a position of interest represented by the position of interest information, may cause the display unit 11 to perform display indicating that it relates to the position of interest. For example, as illustrated in FIG. 4(b), this display is a highlight display in which a red display 220 is inserted into the periphery of the display information 200. Alternatively, as illustrated in FIG. 4(c), this display is an animation display causing the display information 200 to vertically hop. This display may be display other than that described above as long as it is a display indicating that it relates to a position of interest. In addition, these displays may be performed in a case in which this display information 200 is included in a display range in the movement-side display 10 in addition to a case in which the display information 200 is not included in the display range. A user of the movement-side display 10 can easily find the display information 200 or easily recognize the display information 200 by referring to this display. The functions of the movement-side display 10 have been described as above.

As illustrated in FIG. 1, the reference-side display 20 is configured to include a display unit 21, a position of interest information generating unit 22, and a transmission unit 23.

The display unit 21 is a functional unit that performs display in the reference-side display 20. The display unit 21 has a function similar to the display unit 11 of the movement-side display 10 described above. The display unit 21 shares a virtual space and display information with the movement-side display 10 that is another display. The function of the display unit 21 relating to this sharing is similar to the function of the display unit 11 of the movement-side display 10. Information used for display according to the display unit 21 is referred to by the position of interest information generating unit 22.

The position of interest information generating unit 22 is a functional unit that generates position of interest st information representing a position of interest in a virtual space in the reference-side display 20 in accordance with display in the reference-side display 20 by a predetermined trigger. The position of interest information generating unit 22 may detect a visual line of a user on whom the reference-side display 20 is mounted in a real space and generate position of interest information also in accordance with the detected visual line. The position of interest information generating unit 22, in display in the reference-side display 20, may generate position of interest information also in accordance with a position designated by a user of the reference-side display 20. The position of interest information generating unit 22, in display in the reference-side display 20, may generate position of interest information also in accordance with a position of display information designated by a user of the reference-side display 20. The position of interest information generating unit 22 may set an input according to at least one of a voice, an operation, and a gesture of a user of the reference-side display 20 as a predetermined trigger.

For example, the position of interest information generating unit 22 generates position of interest information as below. The position of interest information generating unit 22 inputs a trigger used for generating position of interest information. For example, the position of interest information generating unit 22 receives a request for position of interest information from the movement-side display 10 and inputs the received request as a trigger.

The position of interest information generating unit 22 may input other than a request from the movement-side display 10 as a trigger as below. The position of interest information generating unit 22 inputs a voice of a user of the reference-side display 20 as a trigger. For example, the position of interest information generating unit 22 inputs a voice (speech) of a user of the reference-side display 20 using a microphone or the like included in the reference-side display 20. The position of interest information generating unit 22 performs voice recognition of an input voice and determines whether a character string acquired through the voice recognition is a tag that is a character string set in advance as a trigger. In addition, the voice recognition may be performed by the reference-side display 20 or may be performed by a server that performs the voice recognition. In a case in which the voice recognition is performed by a server, the position of interest information generating unit 22 transmits a voice to the server and receives a result of the voice recognition from the server.

In a case in which it is determined that a character string acquired through voice recognition is a tag set in advance as a trigger, the position of interest information generating unit 22 regards the voice as a trigger. For example, the setting of a tag in advance is performed using a UI of the virtual space of the reference-side display 20 or a management system dedicated to an information processing device connected to the reference-side display 20. In addition, for distinguishment from a conversation between users, the position of interest information generating unit 22 may input a voice of a user only during a period in which the user of the reference-side display 20 is pressing a specific button or a period in which the user is performing a specific hand gesture.

The position of interest information generating unit 22 inputs an operation of the user of the reference-side display 20 as a trigger. For example, the position of interest information generating unit 22 accepts an operation of the user and determines whether or not the accepted operation is a pattern set as a trigger in advance. In a case in which it is determined that the accepted operation is the pattern set as the trigger in advance, the position of interest information generating unit 22 regards the operation as the trigger. The in-advance setting of the pattern may be performed similar to a case in which a voice is set as a trigger.

For example, a pattern that becomes a trigger is an operation of consecutively tapping a center part of a track pad of a smartphone connected to the reference-side display 20 n times (here, n is a natural number set in advance; hereinafter the same). In addition, a pattern that becomes a trigger is an operation of consecutively pulling a trigger button n times or an operation of consecutively pressing a specific button (bumper) n times in a dedicated controller connected to the reference-side display 20. Furthermore, a pattern that becomes a trigger is an operation of reproducing a specific diagram using display of a laser pointer in a virtual space according to a smartphone. For example, the specific diagram has a ring shape. The reproduction of a diagram may be simple air writing, may be actual rendering, or may be any one thereof. Alternatively, a pattern that becomes a trigger may be any other operation.

The position of interest information generating unit 22 receives a gesture, for example, a hand gesture, of a user of the reference-side display 20 as an input as a trigger. For example, the position of interest information generating unit 22 accepts of a gesture of the user and determines whether or not the accepted gesture is a pattern set in advance as a trigger. In a case in which it is determined that the accepted gesture is a pattern set in advance as a trigger, the position of interest information generating unit 22 regards the gesture as the trigger. The in-advance setting of a pattern may be performed similar to a case in which a voice is set as a trigger.

For example, a pattern that becomes a trigger may be a gesture that can be detected using an existing conventional system (for example, first (a hand gesture forming a fist), OK (a hand gesture forming an OK sign), or C (a hand gesture forming the shape of C)). Alternatively, a pattern that becomes a trigger may be any other gesture. For example, the pattern may be a peace sign, an operation of switching from Rock (a first) to Paper (a state in which fingers are spread), or Clap.

When a trigger is input, the position of interest information generating unit 22 generates position of interest information. For example, a position of interest in a virtual space relating to the generated position of interest information is coordinates of the sphere 100 of the virtual space corresponding to a center position of a display screen of the reference-side display 20 (a position of reticle). When the direction of the visual line in the virtual space is set as a position of the center of the display screen, it has coordinates of an intersection between the direction of the visual line (a direction passing though the reticle) and the sphere 100. Since the display unit 11 stores information representing the direction of the visual line of a virtual space, the position of interest information generating unit 22 generates position of interest information by referring to this information. As described above, in a case in which movement of the visual line in the virtual space in the movement-side display 10 is performed only in a predetermined direction (for example, an azimuth angle), position of interest information may represent only the predetermined direction of the position of interest (hereinafter, the same).

Alternatively, the position of interest in the virtual space relating to the generated position of interest information may also be in accordance with a visual line of a user on whom the reference-side display 20 is mounted in a real space. In such a case, the position of interest information generating unit 22 detects a visual line of a corresponding user in a real space. For example, a camera that can image a user's eyeball is disposed in the reference-side display 20. The position of interest information generating unit 22 inputs an image of a user's eyeball acquired through imaging performed by the camera. The position of interest information generating unit 22 detects a visual line of a user in a real space from the input image of an eyeball of the user. For example, the position of interest information generating unit 22 detects a movement of a user's eyeball from a moving image of the user's eyeball and detects a visual line on the basis of the movement. The position of interest information generating unit 22, for example, detects a position of a visual line in a real space on the display screen of the reference-side display 20 (a position of an intersection between the visual line and the display screen, for example, coordinates on the display screen) as a direction of a visual line to be detected. This detection may be performed using a conventional method.

A position of interest in the virtual space relating to generated position of interest information is coordinates of the sphere 100 of the virtual space that corresponds to the position of the visual line in the real space on the display screen of the reference-side display 20. Since the display unit 11 stores information representing the direction of the visual line in the virtual space (in other words, information representing a position in the virtual space that corresponds to the display screen of the reference-side display 20), the position of interest information generating unit 22 calculates coordinates of the sphere 100 in the virtual space that correspond to the position of the visual line from the information and the detected position of the visual line in the real space and sets the coordinates as the position of interest information. The calculation of a position in the virtual space for the coordinates on the display screen may be performed using a conventional method (hereinafter, the same).

Alternatively, a position of interest in the virtual space that relates to the generated position of interest information may also be in accordance with a position (a pointing position) designated by a user of the reference-side display 20 in the display of the reference-side display 20. In such a case, a user designates a position on the display screen (for example, coordinates on the display screen) in the reference-side display 20. The designation of the position of the display screen is performed in accordance with a user's operation. The designation of the position of the display screen may be performed using a cursor or a pointer. The position of interest information generating unit 22 accepts a user's operation and acquires information representing a position of the display screen that is designated by the operation.

A position of interest in the virtual space that relates to the generated position of interest information is coordinates of the sphere 100 of the virtual space that corresponds to a designated position of the display screen of the reference-side display 20. Since the display unit 11 stores information representing the direction of the visual line in the virtual space (in other words, information representing a position in the virtual space that corresponds to the display screen of the reference-side display 20), the position of interest information generating unit 22 calculates coordinates of the sphere 100 of the virtual space that corresponds to the designated position of the display screen from the information and the designated position of the display screen and sets the coordinates as the position of interest information.

Alternatively, a position of interest in the virtual space that relates to the generated position of interest information may also be in accordance with a position of display information (a content) designated by a user of the reference-side display 20 in the display of the reference-side display 20. In such a case, a user designates display information in the reference-side display 20. The display information may be displayed in the reference-side display 20. In such a case, the user designates the display information in the reference-side display 20. The position of interest information generating unit 22 acquires the information that represents the designated position of the display screen. For example, a user designates display information as below.

The position of interest information generating unit 22 stores display information and a tag that is a character string in association with each other in advance. For example, tag "#LION" is associated with the lion 200a illustrated in FIG. 3, tag "#ELEPHANT" is associated with the elephant 200b, and tag "#HORSE" is associated with the horse 200c. The position of interest information generating unit 22 inputs a voice (speech) of a user of the reference-side display 20 using a microphone or the like included in the reference-side display 20. The position of interest information generating unit 22 performs voice recognition of an input voice and determines whether or not a character string acquired through the voice recognition is a tag associated with display information in advance. Similar to the description presented above, the voice recognition may be performed by the reference-side display 20 or may be performed by a server that performs the voice recognition.

In a case in which it is determined that the character string acquired through voice recognition is a tag set in advance, the position of interest information generating unit 22 acquires a position of display information associated with the tag in the virtual space. Since the display unit 11 stores information representing a position of display information in the virtual space, the position of interest information generating unit 22 acquires the stored information. The position of interest information generating unit 22 calculates coordinates of the sphere 100 in the virtual space that corresponds to a position from the position of display information in the virtual space and sets the coordinates as position of interest information. For example, in a case in which display information is arranged in the sphere 100 in the virtual space, information representing the coordinates of a position of the display information in the virtual space is set as position of interest information. For example, in a case in which display information is arranged at a position other than the sphere 100 of the virtual space, information representing coordinates of a position of an intersection between a straight line passing through a position of the display information in the virtual space that extends from the position of the visual line in the virtual space and the sphere 100 of the virtual space is set as a position of interest information.

Designation of display information may be performed using a user's operation other than a user's voice in the reference-side display 20. The position of interest information generating unit 22 stores display information and a user's operation in association with each other in advance. For example, as illustrated in FIG. 5(*a*), a content ID that is an identifier of display information and a controller pattern that is a user's operation are stored in association with each other. Examples of the controller pattern are similar to those of a user's operation that becomes a trigger described above. The position of interest information generating unit 22 accepts an operation of a user of the reference-side display 20 and sets display information associated with the accepted operation as designated display information.

For example, designation of display information may be performed using a gesture, for example, a hand-gesture, of a user of the reference-side display 20. The position of interest information generating unit 22 stores display information and a user's gesture in association with each other in advance. For example, as illustrated in FIG. 5(*b*), a content ID that is an identifier of display information and a hand gesture are stored in association with each other. Examples of the hand gesture are similar to those of the gesture that becomes a trigger described above. The position of interest information generating unit 22 accepts a gesture of a user of the reference-side display 20 and sets display information associated with the accepted gesture as designated display information.

In addition, designation of display information may be performed using a method other than that described above. For example, designation of display information may be performed using a cursor or a pointer. In addition, when designation of display information is performed, the visual line in the virtual space in the reference-side display 20 may be coincided with a position of display information. In addition, in a case in which designation of display information is performed as described above, the designation may be regarded as a trigger for generation of position of interest information. The position of interest information generating unit 22 outputs the generated position of interest information to the transmission unit 23.

The transmission unit 23 is a functional unit that transmits the position of interest information generated by the position of interest information generating unit 22 to the movement-side display 10 that is another display. The transmission unit 23 inputs position of interest information from the position of interest information generating unit 22. In a case in which a request for position of interest information is received from the movement-side display 10, the transmission unit 23 transmits the position of interest information to the movement-side display 10 that is a transmission source of the request.

In a case in which position of interest information is generated by a trigger of the reference-side display 20 side, the transmission unit 23 transmits the position of interest information to the designated movement-side display 10. The movement-side display 10 to which the position of interest information is transmitted may be designated in advance. For example, all the movement-side displays 10 sharing a virtual space and display information may be set as movement-side displays 10 to which the position of interest information is transmitted. Alternatively, the movement-side display 10 to which position of interest information is transmitted may be designated by a user of the reference-side display 20 at a time point at which the position of interest information is transmitted. The functions of the reference-side display 20 have been described as above.

Figure 6:
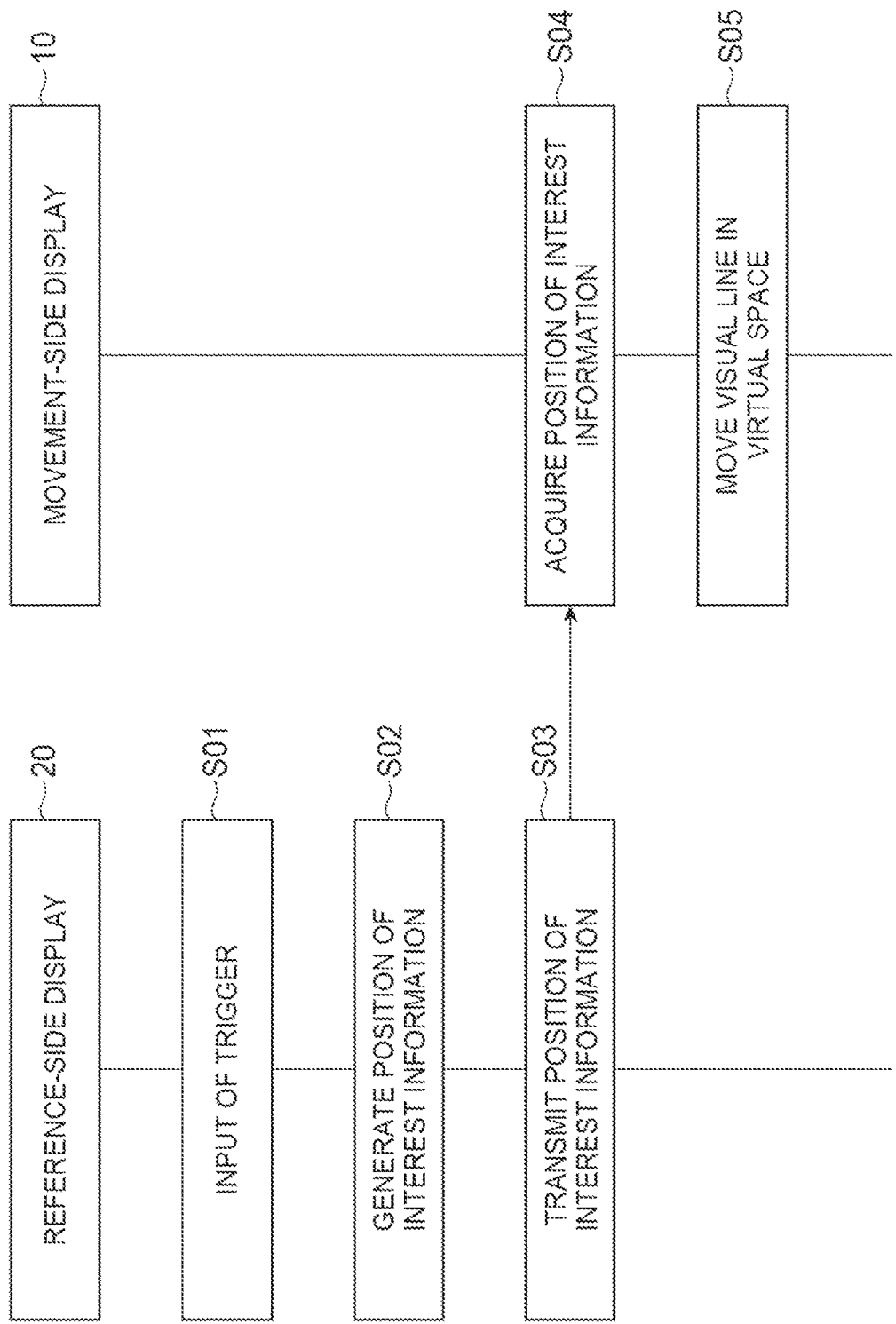
FIG. 6 is a sequence diagram illustrating processes performed by a movement-side display and a reference-side display that are display control devices according to an embodiment of the present invention.

Subsequently, processes performed by the movement-side display 10 and the reference-side display 20 according to this embodiment (operation methods which are performed by the movement-side display 10 and the reference-side display 20) will be described with reference to a sequence diagram illustrated in FIG. 6. This process is a process when display using the display unit 11 in the movement-side display 10 and display using the display unit 21 in the reference-side display 20 are performed. In addition, in the movement-side display 10 and the reference-side display 20, display is performed after a virtual space and display information are shared.

In this process, in the reference-side display 20, a trigger for generating position of interest information is input by the position of interest information generating unit 22 (S01). Subsequently, position of interest information is generated in accordance with display in the reference-side display 20 using the position of interest information generating unit 22 (S02). Subsequently, the generated position of interest information is transmitted to the movement-side display 10 by the transmission unit 23 (S03).

In the movement-side display 10, the position of interest information is received and acquired by the position of interest information acquiring unit 12 (S04). Subsequently, the visual line in the virtual space in the display of the movement-side display 10 is moved on the basis of the position of interest information by the visual line moving unit 13 (S05). The processes performed by the movement-side display 10 and the reference-side display 20 according to this embodiment has been described as above.

According to this embodiment, the visual line in the virtual space in display of the movement-side display 10 is moved on the basis of a position of interest in the virtual space in the reference-side display 20 according to display in the reference-side display 20. Thus, in any one of the displays 10 and 20, display according to a position of interest in the virtual space is performed, and, for example, the same display information can be referred to between users of the displays.

As described above, in display using an independent visual line for each of the displays 10 and 20, display information that is viewed for each user is different. In this embodiment, when the same display information can be easily referred to between users, communication between users can be smoothly performed while referring to the display information without performing mutual communication or the like using speech of a position of display information in the virtual space. In other words, according to this embodiment, in a case in which information of a common virtual space is displayed between a plurality of displays 10 and 20, display can be appropriately performed.

In addition, as described above, the movement-side display 10 may take the following configuration. The visual line may be moved also on the basis of the visual line in the virtual space in display of the movement-side display 10 before movement. More specifically, the visual line may be moved only in a direction set in advance with reference to the visual line in the virtual space in display of the movement-side display 10 before movement, for example, at an azimuth angle as described above. According to such a configuration, a change of the display according to movement of the visual line can be configured to be more acceptable for a user of the movement-side display 10. Here, the movement of the visual line does not necessarily need to be performed as described above and may be performed in any way as long as it is on the basis of the position of interest information.

In addition, in a case in which a position of interest represented by the position of interest information or display information relating to the position of interest is not included in display of the movement-side display 10 after movement of the visual line, the display unit 11 may be caused to perform display representing the position of interest or the position of the display information. According to such a configuration, as described above, by referring to this display, a user of the movement-side display 10 can easily find the position of interest or the display information.

In addition, as described above, after movement of the visual line, for display information relating to a position of interest represented by the position of interest information, the display unit 11 may be caused to perform display indicating that it relates to the position of interest. According to such a configuration, as described above, by referring to this display, a user of the movement-side display 10 can easily find corresponding display information 200 or easily recognize this display information 200. However, such display does not necessarily need to be performed when the visual line moves.

In addition, as described above, the reference-side display 20 may take the following configuration. In generation of the position of interest information, a visual line of a user on whom the reference-side display 20 is mounted in a real space is detected, and position of interest information may be generated also in accordance with the detected visual line. In addition, in display of the reference-side display 20, position of interest information may be generated also in accordance with a position designated by a user of the reference-side display 20. According to such a configuration, a user on whom the reference-side display 20 is mounted can perform sharing of the visual line on the basis of a position of further interest. As a result, in a case in which information of a virtual space common to a plurality of displays 10 and 20 is displayed, display can be performed more appropriately.

In addition, in display of the reference-side display 20, position of interest information may be generated also in correspondence of a position of display information designated by a user of the reference-side display 20. According to such a configuration, a user on whom the reference-side display 20 is mounted can perform sharing of the visual line on the basis of display information of interest. As a result, in a case in which information of a virtual space that is common to a plurality of displays 10 and 20 is displayed, display can be performed more appropriately. However, generation of position of interest information does not necessarily need to be performed in this way, and the display may be performed in accordance with display of the reference-side display 20.

In addition, an input according to at least one of a voice, an operation, and a gesture of a user of the reference-side display 20 may be set as a trigger for generation of the position of interest information. According to such a configuration, easy sharing of the visual line can be performed in accordance with a user of the reference-side display 20 side. However, a trigger for generation of the position of interest information does not necessarily need to be performed as described above.

In the embodiment described above, although the display control device has been described as the movement-side display 10 and the reference-side display 20 having a display function, the display control device may not necessarily have the display function. The display control device is a device (system) that is connected to displays displaying display information arranged in common in a common virtual space between other displays in accordance with a visual line for each display in the virtual space (in other words, including the display unit 11 or the display unit 21) and controls display in the displays and may include the position of interest information acquiring unit 12 and the visual line moving unit 13 described above or the position of interest information generating unit 22 and the transmission unit 23 described above.

In addition, movement of the visual line in the virtual space in the movement-side display 10, for example, synchronization with the visual line in the virtual space in the reference-side display 20 may be one-shot synchronization performed at that moment as a snapshot or may be dynamic synchronization tracking the visual line in the virtual space in the reference-side display 20. In a case in which dynamic synchronization is performed, position of interest information is consecutively transmitted from the reference-side display 20 to the movement-side display 10, and movement of the visual line in the virtual space is sequentially performed on the basis of the position of interest information in the movement-side display 10.

In addition, in the reference-side display 20, a tag or a pattern used for detection of a trigger or designation of display information may be set only for a specific reference-side display 20 or may be set to be common to a plurality of (for example, all the) reference-side displays 20. In a case in which a tag or a pattern is set only for a specific reference-side display 20, only a specific user using the reference-side display 20 can use a function based on the set information. In a case in which a tag or a pattern is set to be common to a plurality of (for example, all the) reference-side displays 20, a plurality of (for example, all the) users using the reference-side displays 20 can use a function based on the set information.

Each block diagram used for description of the embodiment described above illustrates blocks in units of functions. Such functional blocks (component units) are realized by an arbitrary combination of at least one of hardware and software. In addition, a method for realizing each functional block is not particularly limited. In other words, each functional block may be realized by using one device that is combined physically or logically or using a plurality of devices by directly or indirectly (for example, using a wire or wirelessly) connecting two or more devices separated physically or logically. A functional block may be realized by one device or a plurality of devices described above and software in combination.

As functions, there are deciding, determining, judging, computing, calculating, processing, deriving, inspecting, searching, checking, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like, and the functions are not limited thereto. For example, a functional block (constituent unit) enabling transmission to function is referred to as a transmitting unit or a transmitter. As described above, a method for realizing all the functions is not particularly limited.

Figure 7:
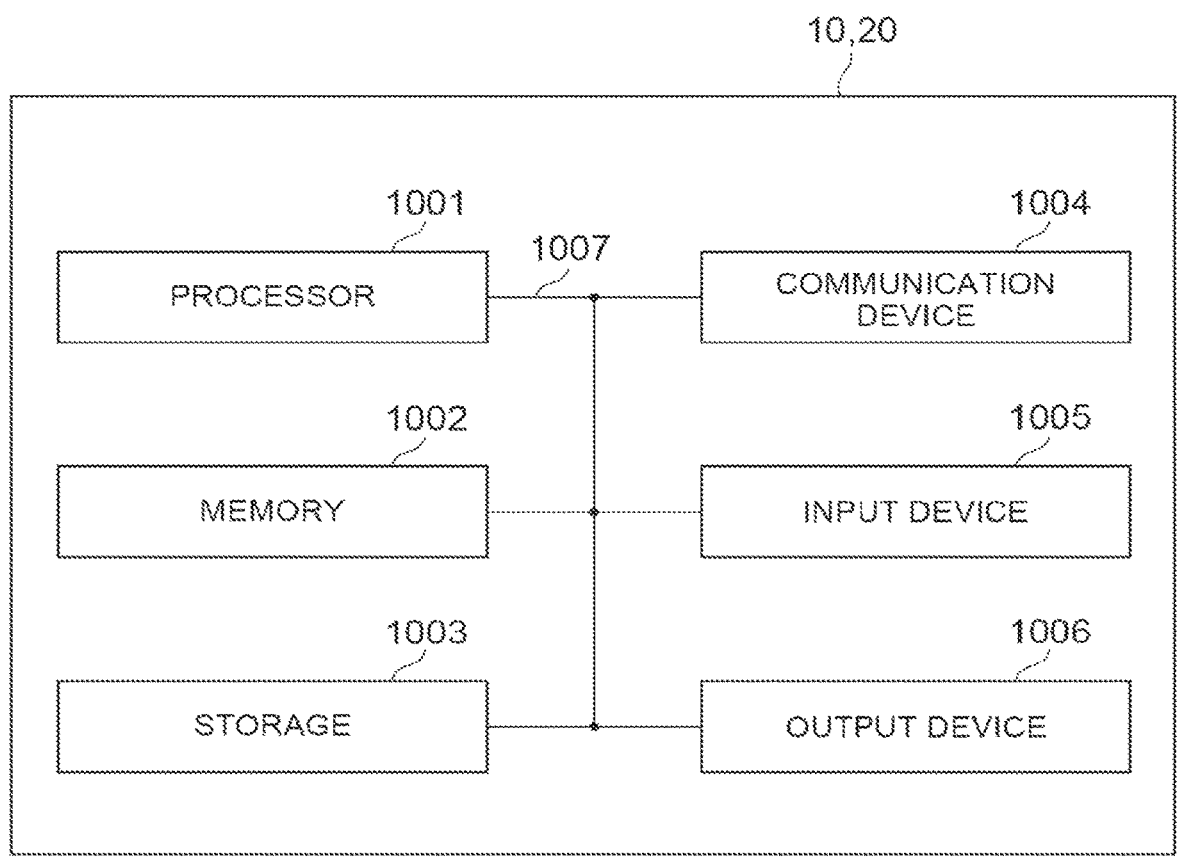
FIG. 7 is a diagram illustrating a hardware configuration of a movement-side display and a reference-side display that are display control devices according to an embodiment of the present invention.

For example, the displays 10 and 20 according to one embodiment of the present disclosure may function as a computer that performs information processing of the present disclosure. FIG. 7 is a diagram illustrating an example of a hardware configuration of the displays 10 and 20 according to an embodiment of the present disclosure. The displays 10 and 20 described above, physically, may be configured as a computer device including a processor 1001, a memory 1002, a storage 1003, a communication device 1004, an input device 1005, an output device 1006, a bus 1007, and the like.

In addition, in the following description, a term "device" may be rephrased as a circuit, a device, a unit, or the like. The hardware configuration of the displays 10 and 20 may be configured to include one or a plurality of devices illustrated in the drawing and may be configured without including some of these devices.

Each function of the displays 10 and 20 may be realized when the processor 1001 performs an arithmetic operation by causing predetermined software (a program) to be read onto hardware such as the processor 1001, the memory 1002, and the like, controls communication using the communication device 1004, and controls at least one of data reading and data writing for the memory 1002 and the storage 1003.

The processor 1001, for example, controls the entire computer by operating an operating system. The processor 1001 may be configured by a central processing unit (CPU) including an interface with peripheral devices, a control device, an arithmetic operation device, a register, and the like. For example, each function of the displays 10 and 20 described above may be realized by the processor 1001.

In addition, the processor 1001 reads a program (program code), a software module, data, and the like from at least one of the storage 1003 and the communication device 1004 into the memory 1002 and executes various processes in accordance with these. As the program, a program causing a computer to execute at least some of the operations described in the embodiment described above is used. For example, each function of the displays 10 and 20 may be realized by a control program that is stored in the memory 1002 and operated by the processor 1001. Although the various processes described above have been described as being executed by one processor 1001, the processes may be executed simultaneously or sequentially by two or more processors 1001. The processor 1001 may be realized using one or more chips. In addition, the program may be transmitted from a network through a telecommunication line.

The memory 1002 is a computer-readable recording medium and, for example, may be configured by at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), or the like. The memory 1002 can store a program (a program code), a software module, and the like executable for performing the information processing according to one embodiment of the present disclosure.

The storage 1003 is a computer-readable recording medium and, for example, may be configured by at least one of an optical disc such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium included in the displays 10 and 20, for example, may be a database including at least one of the memory 1002 and a storage 1003, a server, or any other appropriate medium.

The communication device 1004 is hardware (a transmission/reception device) for performing inter-computer communication through at least one of a wired network and a wireless network and, for example, may be called also a network device, a network controller, a network card, a communication module, or the like.

The input device 1005 is an input device (for example, a keyboard, a mouse, a microphone, a switch, buttons, a sensor, or the like) that accepts an input from the outside. The output device 1006 is an output device (for example, a display, a speaker, an LED lamp, or the like) that performs output to the outside. In addition, the input device 1005 and the output device 1006 may have an integrated configuration (for example, a touch panel).

In addition, devices such as the processor 1001, the memory 1002, and the like are connected using a bus 1007 for communication of information. The bus 1007 may be configured as a single bus or buses different between devices.

In addition, the displays 10 and 20 may be configured to include hardware such as a microprocessor, a digital signal processor (DSP), an application specific integrated circuit (ASIC), a programmable logic device (PLD), a field programmable gate array (FPGA), or the like, and a part or the whole of each functional block may be realized by the hardware. For example, the processor 1001 may be mounted using at least one of such hardware components.

The processing sequence, the sequence, the flowchart, and the like of each aspect/embodiment described in the present disclosure may be changed in order as long as there is no contradiction. For example, in a method described in the present disclosure, elements of various steps are presented in an exemplary order, and the method is not limited to the presented specific order.

The input/output information and the like may be stored in a specific place (for example, a memory) or managed using a management table. The input/output information and the like may be overwritten, updated, or added to. The output information and the like may be deleted. The input information and the like may be transmitted to another device.

A judgment may be performed using a value ("0" or "1") represented by one bit, may be performed using a Boolean value (true or false), or may be performed using a comparison between numerical values (for example, a comparison with a predetermined value).

The aspects/embodiments described in the present disclosure may be individually used, used in combination, or be switched therebetween in accordance with execution. In addition, a notification of predetermined information (for example, a notification of being X) is not limited to being performed explicitly and may be performed implicitly (for example, a notification of the predetermined information is not performed).

As above, while the present disclosure has been described in detail, it is apparent to a person skilled in the art that the present disclosure is not limited to the embodiments described in the present disclosure. The present disclosure may be modified or changed without departing from the concept and the scope of the present disclosure set in accordance with the claims. Thus, the description presented in the present disclosure is for the purpose of exemplary description and does not have any limited meaning for the present disclosure.

It is apparent that software, regardless of whether it is called software, firmware, middleware, a microcode, a hardware description language, or any other name, may be widely interpreted to mean a command, a command set, a code, a code segment, a program code, a program, a sub-program, a software module, an application, a software application, a software package, a routine, a subroutine, an object, an executable file, an execution thread, an order, a function, and the like.

In addition, software, a command, information, and the like may be transmitted and received via a transmission medium. For example, in a case in which software is transmitted from a website, a server, or any other remote source using at least one of a wiring technology such as a coaxial cable, an optical fiber cable, a twisted pair, a digital subscriber line (DSL) or the like and a radio technology such as infrared rays, radio waves, microwaves, or the like, at least one of such a wiring technology and a radio technology is included in the definition of the transmission medium.

Terms such as "system" and "network" used in the present disclosure are interchangeably used.

In addition, information, a parameter, and the like described in the present disclosure may be represented using absolute values, relative values with respect to predetermined values, or other corresponding information.

Terms such as "determining" used in the present disclosure may include various operations of various types. The "determining", for example, may include a case in which judging, calculating, computing, processing, deriving, investigating, looking up, search, and inquiry (for example, looking up a table, a database, or any other data structure), or ascertaining is regarded as "determining". In addition, "determining" may include a case in which receiving (for example, receiving information), transmitting (for example, transmitting information), input, output, or accessing (for example, accessing data in a memory) is regarded as "determining". Furthermore, "determining" may include a case in which resolving, selecting, choosing, establishing, comparing, or the like is regarded as "determining". In other words, "determining" includes a case in which a certain operation is regarded as "determining". In addition, "determining" may be rephrased with "assuming", "expecting", "considering", and the like.

Terms such as "connected" or "coupled" or all the modifications thereof mean all the kinds of direct or indirect connection or coupling between two or more elements and may include presence of one or more intermediate elements between two elements that are mutually "connected" or "coupled". Coupling or connection between elements may be physical coupling or connection, logical coupling or connection, or a combination thereof. For example, "connection" may be rephrased with "access". When used in the present disclosure, two elements may be considered as being mutually "connected" or "coupled" by using one or more wires and at least one of a cable and a print electric connection and, as several non-limiting and non-comprehensive examples, by using electromagnetic energy having wavelengths in a radio frequency region, a microwave region, and a light (both visible light and non-visible light) region.

Description of "on the basis of" used in the present disclosure does not mean "only on the basis of" unless otherwise mentioned. In other words, description of "on the basis of" means both "only on the basis of" and "on the basis of at least."

Any referring to elements, for which names of "first", "second", and the like are used, used in the present disclosure does not generally limit the amount or the sequence of such elements. Such names may be used in the present disclosure as a convenient way for distinguishing two or more elements from each other. Accordingly, referring to the first and second elements does not mean that only the two elements are employed therein or the first element precedes the second element in a certain form.

In a case in which "include," "including," and modifications thereof are used in the present disclosure, such terms are intended to be inclusive like a term "comprising." In addition, a term "or" used in the present disclosure is intended to be not an exclusive logical sum.

In the present disclosure, for example, in a case in which an article such as "a," "an," or "the" in English is added through a translation, the present disclosure may include a plural form of a noun following such an article.

In the present disclosure, a term "A and B are different" may mean that "A and B are different from each other". In addition, the term may mean that "A and B are different from C". Terms "separated", "combined", and the like may be interpreted similar to "different".

REFERENCE SIGNS LIST

10 Movement-side display
11 Display unit
12 Position of interest information acquiring unit
13 Visual line moving unit
20 Reference-side display
21 Display unit
22 Position of interest information generating unit
23 Transmission unit
1001 Processor
1002 Memory
1003 Storage
1004 Communication device
1005 Input device
1006 Output device
1007 Bus

The invention claimed is:

1. A display control device that performs control relating to display in a display displaying display information arranged in common in a common virtual space with another display device in accordance with a visual line for each display in the virtual space based on a position or a posture in a real space for each display, the display control device comprising circuitry configured to:
   acquire position of interest information representing a position of interest in a virtual space in the other display according to display in the other display; and
   move the visual line in the virtual space in the display of the display on the basis of the position of interest information.

2. The display control device according to claim 1, wherein the circuitry moves the visual line also on the basis of the visual line in the virtual space in the display of the display before movement.

3. The display control device according to claim 2, wherein the circuitry moves the visual line in a direction set in advance with reference to the visual line in the virtual space in the display of the display before movement.

4. The display control device according to claim 3, wherein, in a case in which a position of interest represented by the position of interest information or display information relating to the position of interest is not included in the display of the display, the circuitry causes the display to perform display representing the position of interest or a position of the display information.

5. The display control device according to claim 2, wherein, in a case in which a position of interest represented by the position of interest information or display information relating to the position of interest is not included in the display of the display, the circuitry causes the display to perform display representing the position of interest or a position of the display information.

6. The display control device according to claim 1, wherein, in a case in which a position of interest represented by the position of interest information or display information relating to the position of interest is not included in the display of the display, the circuitry causes the display to perform display representing the position of interest or a position of the display information.

7. The display control device according to claim 1, wherein, for display information relating to a position of interest represented by the position of interest information, the circuitry causes the display to perform display representing that the display information relates to the position of interest.

8. A display control device that performs control relating to display in a display displaying display information arranged in common in a common virtual space with another display device in accordance with a visual line for each display in the virtual space based on a position or a posture in a real space for each display, the display control device comprising circuitry configured to:
   generate position of interest information representing a position of interest in a virtual space in the display in accordance with display in the display by a predetermined trigger; and
   transmit the position of interest information to another display.

9. The display control device according to claim 8, wherein the circuitry detects a visual line of a user on whom the display is mounted in a real space and generates the position of interest information also in accordance with the detected visual line.

10. The display control device according to claim 9, wherein the circuitry generates the position of interest information also in accordance with a position designated by a user of the display in display in the display.

11. The display control device according to claim 8, wherein the circuitry generates the position of interest information also in accordance with a position designated by a user of the display in display in the display.

12. The display control device according to claim 8, wherein, for display in the display, the circuitry generates the position of interest information also in accordance with a position of display information designated by a user of the display in display in the display.

13. The display control device according to claim 8, wherein the circuitry sets an input according to at least one of a voice, an operation, and a gesture of a user of the display as the predetermined trigger.

* * * * *